W. H. CRAWFORD.
DRAG LINE SCRAPER.
APPLICATION FILED JULY 25, 1919.
1,332,609.
Patented Mar. 2, 1920.
2 SHEETS—SHEET 1.
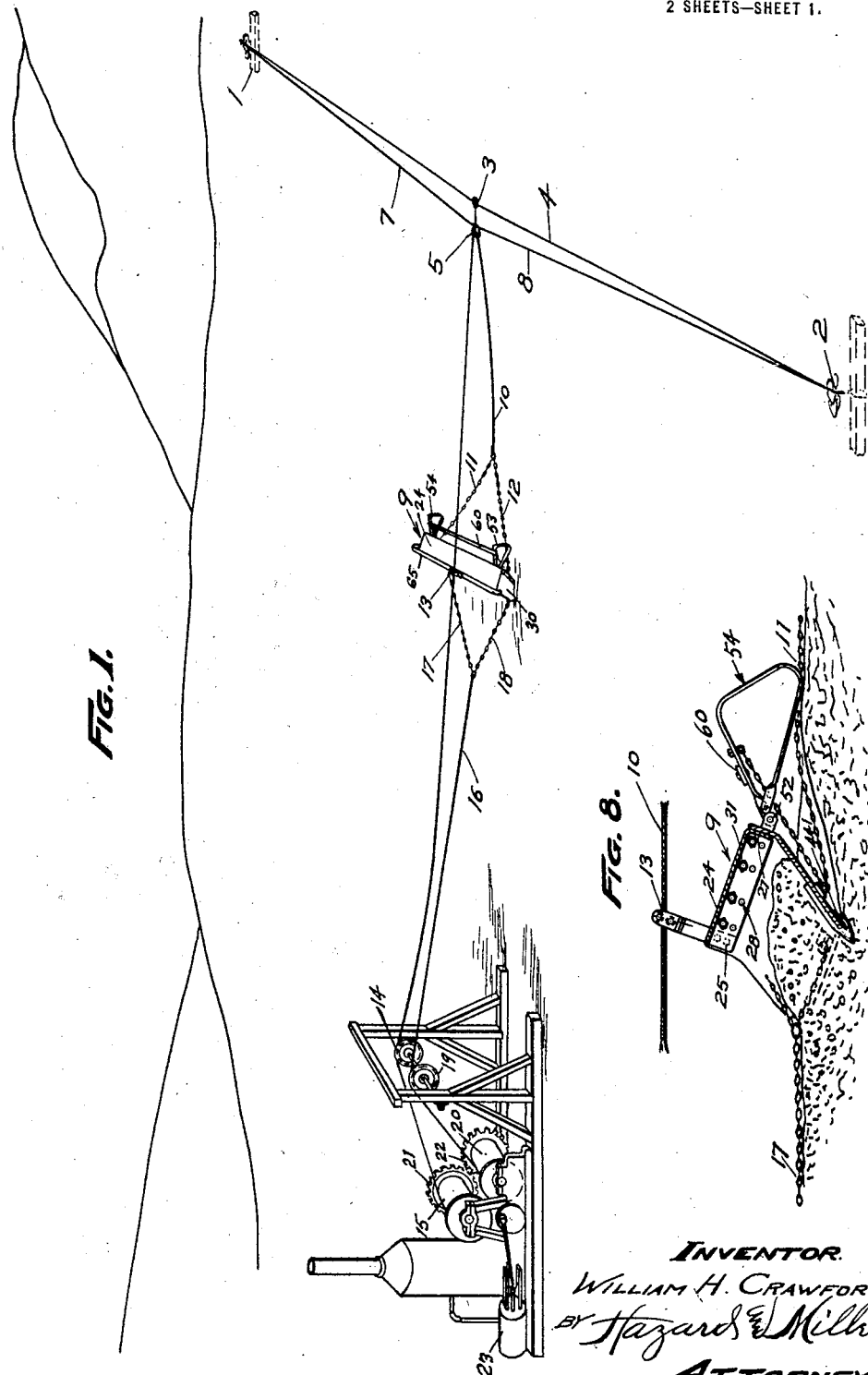
INVENTOR.
WILLIAM H. CRAWFORD
BY Hazard & Miller
ATTORNEYS W. H. CRAWFORD.
DRAG LINE SCRAPER.
APPLICATION FILED JULY 25, 1919.
1,332,609.
Patented Mar. 2, 1920.
2 SHEETS—SHEET 2.
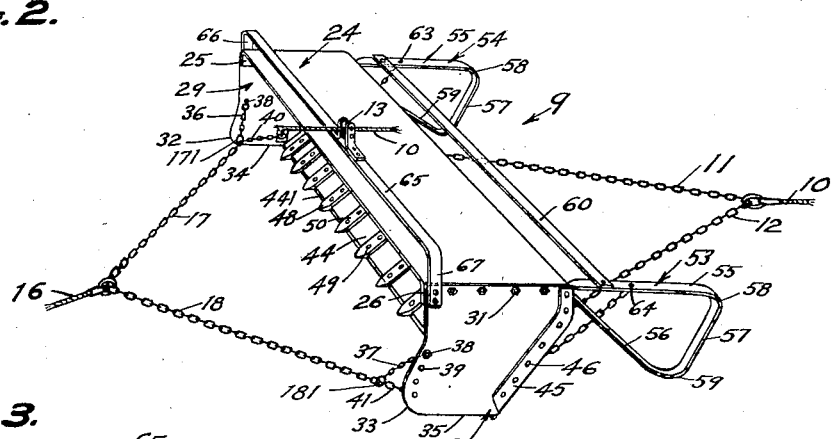
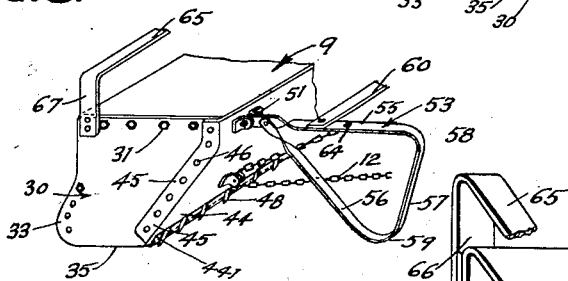
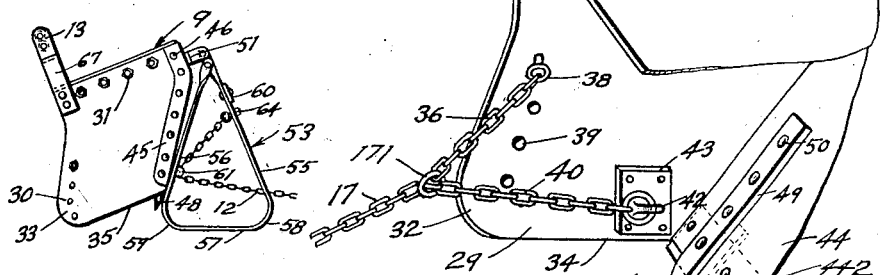
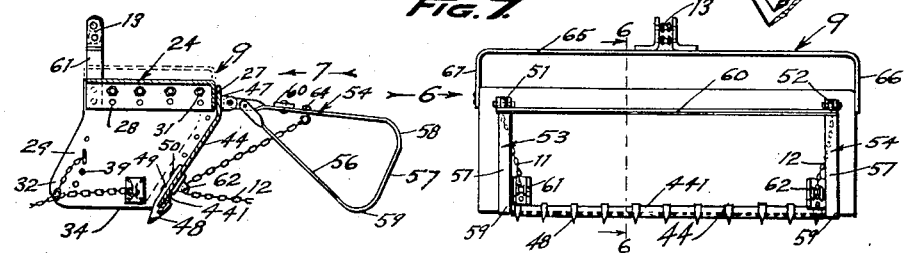
INVENTOR
WILLIAM H. CRAWFORD
BY
ATTORNEYS.

UNITED STATES PATENT OFFICE.

WILLIAM H. CRAWFORD, OF LOS ANGELES, CALIFORNIA, ASSIGNOR TO CHARLOTTE E. CRAWFORD, OF LOS ANGELES, CALIFORNIA.

DRAG-LINE SCRAPER.

1,332,609. Specification of Letters Patent. Patented Mar. 2, 1920.

Application filed July 25, 1919. Serial No. 313,358.

*To all whom it may concern:*

Be it known that I, WILLIAM H. CRAWFORD, a citizen of the United States, residing at Los Angeles, in the county of Los Angeles and State of California, have invented new and useful Improvements in Drag-Line Scrapers, of which the following is a specification.

My invention relates to dirt scrapers and consists of the novel features herein shown, described and claimed.

My object is to make a drag line dirt scraper to be operated from a single power to be moved forwardly and backwardly and to load and dump automatically.

Figure 1 is a perspective upon a reduced scale of a drag line dirt scraper embodying the principles of my invention in use.

Fig. 2 is a perspective of the scraper element with the parts in position to load, the view being taken from the front.

Fig. 3 is a fragmentary perspective of the same construction as shown in Fig. 2, the view being taken from the rear.

Fig. 4 is an enlarged fragmentary perspective of the inside and showing the same parts in detail as are shown in the farther side in Fig. 2.

Fig. 5 is a side elevation with the parts in dumping position.

Fig. 6 is a vertical longitudinal cross sectional detail on the line 6—6 of Fig. 7.

Fig. 7 is a rear elevation looking in the direction indicated by the arrow 7 in Fig. 6.

Fig. 8 is a view analogous to Fig. 6 and showing the parts in working positions.

Referring to Fig. 1, the dead men or anchors 1 and 2 are placed in a field to be operated upon at right angles to the line of travel of the scraper. The eye 3 is slidingly mounted on the cable 4, and the ends of the cable are secured to the anchors 1 and 2. The pulley 5 is connected to the eye 3 by a connector 6. The rope 7 is attached to the connector 6 and extends to the anchor 1, and the rope 8 is attached to the connector 6 and extends to the anchor 2, so that by loosening one rope 7 or 8 and pulling the other rope the eye 3 may be moved one way or the other upon the cable 4 and then the ropes attached to the anchors to hold the eye in its adjusted position.

The scraping element 9 has a backing cable 10 connected to chains 11 and 12, the chains 11 and 12 being connected to the ends of the scraping element and extending backwardly, and the backing cable 10 extending backwardly around the pulley 5 then forwardly through the guide rollers 13 then forwardly over the guide roller 14 to the windlass 15.

The pulling cable 16 is attached to the chains 17 and 18 and the chains are attached to the ends of the scraping element and extend forwardly, and the pulling cable 16 extends over the guide roller 19 to the windlass 20. The windlasses 15 and 20 are connected together by gears 21 and 22 so as to run in opposite directions and the gears 21 and 22 are driven from an engine 23, so that when the engine is operating and the clutch connected the pulling cable 16 will be wound upon the windlass 20 and the backing cable 10 will be unwound from the windlass 15 to pull the scraper forwardly to the desired extent; then the reversing gear will be operated or the engine reversed to unwind the pulling cable 16 and wind up the backing cable 10 to move the scraper backwardly to the desired extent.

Referring to Figs. 2 to 7 the details of the scraper element 9 are as follows:

The top consists of a flat rectangular plate 24 having end flanges 25 and 26 extending downwardly at right angles and a rear flange 27 extending downwardly at right angles. The end flanges 25 and 26 preferably have two rows of bolt holes 28. The runners 29 and 30 are irregularly shaped flat plates fitting against the end flanges 25 and 26 and secured in place by bolts 31, so that by moving the bolts from one row of holes 28 to another row of holes 28 the height of the top 24 may be adjusted. The runners 29 and 30 have round front corners 32 and 33 and lower bearing edges 34 and 35. The corners 32 and 33 and the lower edges 34 and 35 are thin so as to cut the dirt and allow the scraper to sink in the ground to the desired depth.

The chains 17 and 18 run through rings 171 and 181 and the rings 171 and 181 are connected to the lower ends of the chains 36 and 37, and the chains 36 and 37 are secured to eye bolts 38. The eye bolts 38 are inserted through desired ones of vertical rows of perforations 39, so that the eye bolts may be raised or lowered. The end portions 40 and 41 of the chains 17 and 18 are connected to ears 42 extending inwardly from the attaching plates 43, and the attaching plates 43 are riveted against the inner faces of the runners 29 and 30 near the rear lower corners. The chains 36 and 37 serve to raise or lower the lines upon which the chains 17 and 18 pull and assist in tilting the scraper to make it take dirt, and the depth to which the scraper will carry is regulated by the adjustable top, the scraper being bottomless.

The cutting or scraping plate 44 is a flat piece of sheet metal fitting against the rear edges of the runners 29 and 30 and having flanges 45 bent at right angles to fit against the outer faces of the runners and secured in place by rivets 46. In actual operation, as in Fig. 8, the runners 29 and 30 form the sides of the scraper to hold the dirt from going out around the ends of the plate 44. The upper edge portion 47 of the plate 44 telescopes with the flange 27 and the plate 44 stands at an angle of about 60° relative to the top 24.

A cutting plate 441 is secured against the rear face of the lower edge of the scraping plate 44 and extends below the edge of the scraping plate and below the edges of the runners or sides 29 and 30, and the cutting plate 441 is secured in place by rivets 442. Teeth 48 extend downwardly from the lower edge of the scraping plate 44 and from the lower edge of the cutting plate 441 and have attaching plates 49 fitting against the front inner faces of the plate 44 and 441 and secured in place by rivets 50. The teeth 48 and the cutting plate 441 serve to dig up the ground and throw the dirt upwardly in front of the plate 44 and to loosen the ground for the next cut of the scraper. Bearing ears 51 and 52 are secured to the rear face of the plate 44 near the upper corners and the dumping and backing up runners 53 and 54 are hingedly connected to the ears 51 and 52.

The runners 53 and 54 are substantially alike and are constructed of heavy strap iron, and each runner comprises an upper straight portion 55, a lower straight inclined portion 56, and the central supporting portion 57, the corners 58 and 59 at the ends of the portion 57 being rounded so as to run either way. A brace 60 connects the portions 55 near their forward ends.

When the scraping element 9 is going ahead the runners 53 and 54 drag, and when the scraping element is dumping or going backwardly the supporting portions 57 come into use, and the portions 53 and 56 are long enough to raise the teeth 48 from the ground as in Fig. 5.

The chains 11 and 12 extend around rollers 61 and 62 secured to the rear face of the plate 44 near its lower corner and the chains are connected by eye bolts 63 and 64 to the portions 55 of the runners 53 and 54, so that when the pulling cable 16 is being operated to move the scraping element forwardly and the backing cable 10 is released the runners 53 and 54 will drag, and when the pulling cable 16 is released and the backing cable 10 is pulling the chains 11 and 12 will pull the rollers 61 and 62 toward the eye bolts 63 and 64 thereby raising the teeth 48 from the ground and throwing the scraper element on to the supporting portions 57, and continued operation will pull the scraper element backwardly to the desired extent. As soon as the operation is reversed by pulling the cable 16 and releasing the chain 10 the scraper element will straighten out, as in Fig. 2, ready for the scraping operation.

The guide rollers 13 are mounted upon the center of the supporting bar 65 and the ends 66 and 67 of the supporting bar are bent downwardly and secured to the upper front corners of the runners 29 and 30, the object being simply to keep the cable 16 in line and keep it from being tangled up with the scraper element 9 when the cable is slack.

Referring to Fig. 8, when the pulling cable 16 is operated to move the scraper element from the position shown in Fig. 5 to the position shown in Fig. 2 the teeth 48 will engage the ground first at an angle of about 45°, and as the teeth 48 draw into the ground the corners 32 and 33 will ride upon the ground and the edges 34 and 35 will cut into the ground, and as the dirt pulls up in front of the plate 44 the chains 17 and 18 run upon the surface of the ground and the plate 44 gradually assumes a scraping position or loading position by tilting backwardly as shown in Fig. 8 until the space in front of the plate 44 below the top 24 is filled with dirt. Then the plate 44 is nearly horizontal and will slide along the face of the ground to move the dirt to the desired point; then the operation is reversed to move the scraper element backwardly to begin a new cut.

The details of the power mechanism are not a part of my present invention, and so far as my invention goes the only essentials are that means be provided for winding the cables back and forth. Obviously a reversible engine, or a reversible transmission, or an electric motor, or a gasolene engine might be adapted for the purpose. Other operations and advantages are obvious.

Various changes may be made without departing from the spirit of my invention as claimed.

I claim:

1. A drag line dirt scraper comprising a top plate, runners connected to the ends of the top plate, a scraping plate connected against the rear edges of the runners and the rear side of the top plate, pulling chains having branches connected to the runners, the upper branches being adapted for vertical adjustment, dumping and backing up runners hingedly connected to the scraping plate, pulleys connected to the scraping plate, and a backing cable having branches extending around the pulleys and connected to the dumping and backing up runners.

2. A drag line scraper element comprising a top plate, runners adjustably connected to the ends of the top plate, a scraping plate connected against the rear edges of the runners and top plate, the scraping plate being at an angle of about 60° to the top plate, dumping and backing up runners hingedly connected to the scraping plate, rollers secured to the scraping plate, and a backing cable having branches extending around the rollers and connected to the dumping and backing up runners.

3. A drag line scraper element comprising runners, a top adjustably connected to the runners, a scraping plate connected against the rear edges of the runners and the rear edge of the top at an angle of about 60° relative to the top, teeth extending from the edge of the scraping plate, means for adjustably connecting a pulling line to the runners and backing up runners adapted to be positioned out of engagement when the scraper is being drawn forward and to be thrown into engagement when the scraper is being drawn backward.

4. A drag line scraper comprising runners, a scraping plate connected to the runners; and backing up runners hingedly connected to the scraping plate and adapted to be thrown into engagement when the scraper is being drawn backward.

5. A drag line scraper comprising runners, a scraping element connected to the runners; and backing up runners hingedly connected to the scraping element and disposed to be thrown into action when the scraper is drawn backward and adapted to raise the scraping element clear of the ground in its backward travel.

In testimony whereof I have signed my name to this specification.

WILLIAM H. CRAWFORD.